United States Patent

[11] 3,544,087

[72] Inventor Robert L. McIlvaine
    Glencoe, Illinois
[21] Appl. No. 816,922
[22] Filed April 17, 1969
[45] Patented Dec. 1, 1970
[73] Assignee National Dust Collector Corporation
    Skokie, Illinois
    a corporation of Illinios

[54] FILTER APPARATUS FOR GAS SCRUBBER
    13 Claims, 4 Drawing Figs.
[52] U.S. Cl. ................................................ 261/81;
    55/226; 229; 233; 257; 260; 337, 418, 423, 424, 457;
    261/90, 109, 111
[51] Int. Cl. ..................................................... B01d 47/16
[50] Field of Search ........................................... 55/226,
    229, 233, 337, 260, 240, 257, 418, 457, 423—24;
    261/90, 94—98, 108—112, 81

[56] References Cited
    UNITED STATES PATENTS
    3,348,825 10/1967 McIlvaine ................ 55/257X
    3,488,039 1/1970 Ekman .................... 261/112X Primary Examiner—Frank W. Lutter
Assistant Examiner—Vincent H. Gifford
Attorney—Mason, Kolehmainen, Rathburn & Wyss ABSTRACT: Filter apparatus for a gas scrubber comprising a plurality of elongated filter elements extending transversely across a flow passage and defining a plurality of separate flow paths between adjacent elements. First support means is provided for maintaining a first group of said elements in a fixed position in said flow passage and second support means is provided for supporting a second group of said elements for movement toward and away from said elements of said first group to increase and decrease the spacing or area defining said separate flow paths between adjacent elements in response to the flow pressure or buoyancy of said gas moving through said scrubber.

Patented Dec. 1, 1970
3,544,087
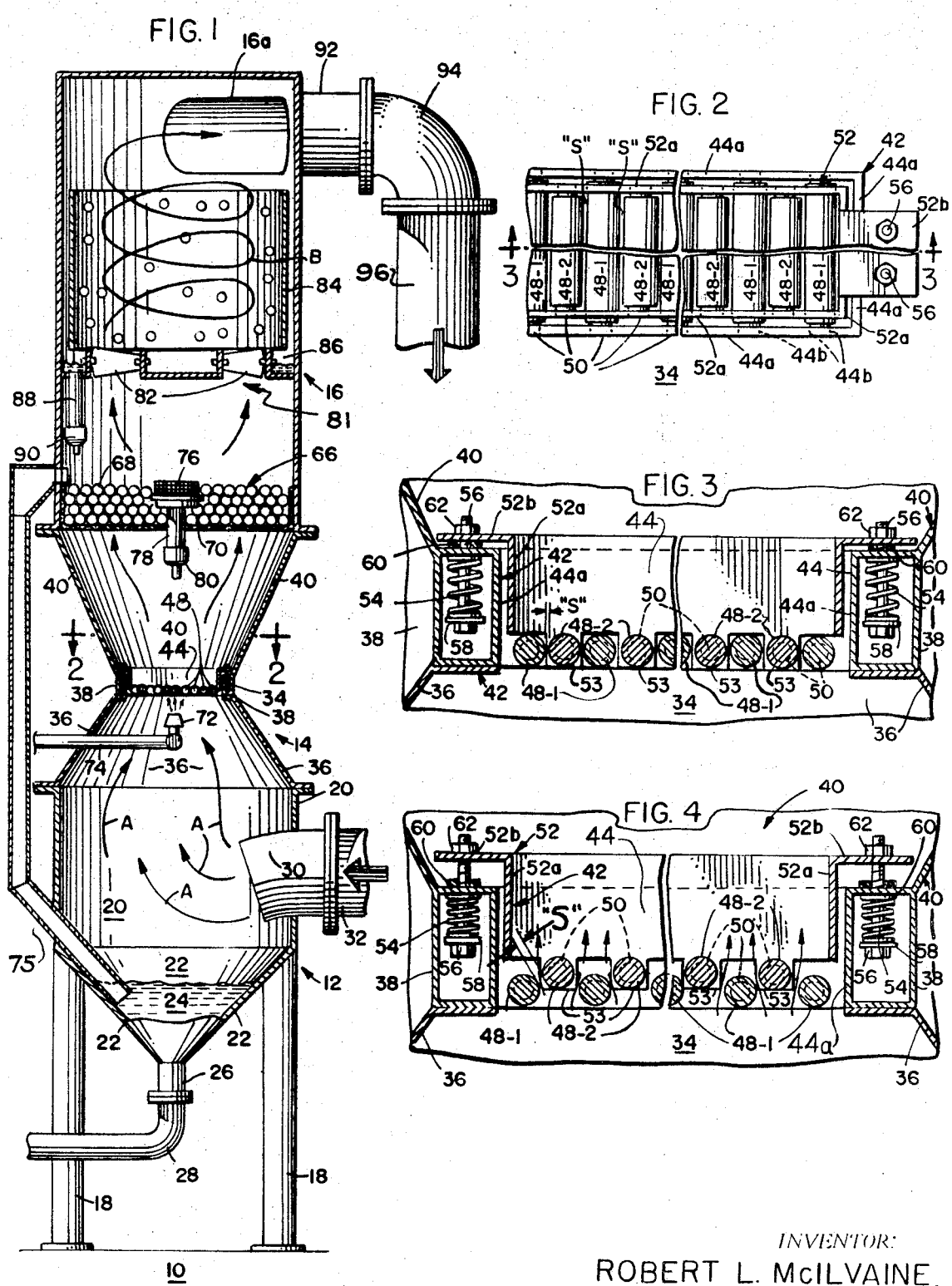
INVENTOR:
ROBERT L. McILVAINE,
BY,
Mason, Kolehmainen, Rathburn & Wyss,
ATT'YS.

FILTER APPARATUS FOR GAS SCRUBBER

The present invention relates to a new and improved filter apparatus for a gas scrubber, more particularly a gas scrubber of the type adapted for using scrubbing liquid (usually water) which is introduced into the gas flow to agglomerate and collect the contaminant particles therein.

The present invention comprises an improvement on the filter bed structure illustrated and described in U. S. Pat. No. 3,348,825 and in copending U.S. Pat. application Ser. No. 730,517 now U.S. Pat. No. 3,488,039, filed May 20, 1968. In the gas scrubbing apparatus described in the aforementioned copending U.S. Pat. application, there is provided a filter bed with a plurality of individual, separately supported elongated filter elements which are arranged in a novel frame structure for limited free floating movement toward and away from adjacent elements, and with and against the direction of gas flow. In the present invention, a plurality of elongated filter elements, such as rods, tubes or pipes, and the like, are arranged in parallel, spaced-apart relation to provide a plurality of narrow slots or flow passages for producing a high velocity flow of gas through a reduced area nozzle section in the scrubber housing. A first group of the filter elements are fixedly supported within the nozzle section in parallel arrangement on a common plane, and a second group of elements, spaced alternately between the elements in the first group, are supported on a separate framework which is movable between limits toward and away from the elements of the first group in a direction parallel to the general direction of gas flow through the scrubber.

In many installations, for example, when gas scrubbers are used for treating gases generated in iron-melting cupola furnaces, steel-melting open-hearth furnaces, electric furnaces and the like, it is desirable to closely correlate the quantity or volume of gas withdrawn from the furnace housing with the volume of input or blast air supplied to the furnace. Regulation of the volume of gas removed affects the amount of air which can infiltrate through the charging doors of the furnace structure and one method of accomplishing control of gas flow in and out of a furnace is by the installation of a flow meter on the input or air-blast duct and in the outlet duct or hood leading to the gas scrubber. Signals from the input and output flow meters are electronically integrated and the resulting impulse is used for controlling a damper or the like positioned in an outlet or exhaust duct from the gas scrubber. In high efficiency, wet-type gas scrubbers, such as those shown and described in the aforementioned U.S. Pat and in the copending U.S. Pat. application previously mentioned, the collection efficiency or percentage of contaminant particles separated out of the gas is in a direct relation to the velocity of the gas passing through the filter bed of the scrubber. The gas velocity in turn is a measure of the pressure drop in the system and, with higher pressure drops, more power is required and operating costs are likewise higher.

In order to maintain a desired minimum efficiency, or percentage of contaminants removed from the gas in installations where the gas flow rate varies over a range, it is necessary to adjust the flow area of the venturi region in the gas scrubber to maintain the velocity within a usable range. Presently, some wet scrubbers employ electrical means for sensing the velocity of the gas flow in the critical flow areas of the scrubber, and signals produced by these electrical sensing devices are integrated electrically and used for controlling powered mechanical means which are effective to expand and contract the effective flow area for the gas and thereby to control and maintain the gas velocity in a desirable range. In the aforementioned U.S. copending Pat. application, the filter elements are individually movable within a limited distance so that the spacing between adjacent elements is adjusted and varied from time to time in accordance with the input of gas to the scrubber so that the velocity is maintained relatively constant.

The present invention comprises an improvement over previous types of self-adjusting filter beds as described and includes means for supporting two groups of alternately spaced, elongated filter elements and biasing one group of elements against the buoyant force of the high velocity gases so that the elements automatically open and close the spacing between adjacent pairs in response to the volume of gas supplied thereby maintaining a relatively constant gas velocity. With a relatively uniform gas velocity, the efficiency of particle separation is relatively uniform even though the flow rate or volume of gas being handled by the scrubber varies over a wide range. The automatic, self-adjusting filter bed apparatus of the present invention does not require elaborate electronic sensing devices and circuitry and thus eliminates much costly equipment. Also, the gas scrubber of the present invention is extremely effective for a wide variety of applications wherein many different types of contaminants and impurities are encountered and wherein the flow rate of gas to be treated varies widely.

It is an object of the present invention to provide a new and improved gas scrubber and filter apparatus therefor.

Another object of the present invention is to provide a new and improved gas scrubber and filter apparatus of the character described wherein the velocity of gas flow between adjacent filter elements is maintained within a desired range even though the flow rate or volume of gases being treated in the gas scrubber varies widely.

Still another object of the present invention is to provide a new and improved automatic, self-regulating filter apparatus for a gas scrubber which provides a substantially constant range of gas velocity through the apparatus, even though the volume flow rate of gases being treated changes widely.

The foregoing and other objects and advantages of the present invention are accomplished in an illustrated embodiment thereof comprising a gas scrubber employing a new and improved filter apparatus including a plurality of elongated filter elements mounted in spaced-apart, parallel, side-by-side relation generally transversely across a narrow flow path or nozzle structure. Each filter element includes a substantially large exterior surface area and means are provided for wetting the elements with scrubbing liquid so that the contaminant particles and impurities in the gas passing around the elements impinge against the liquid film and are agglomerated and collected in the liquid. A first group of filter elements is supported in fixed relation in the flow path defining structure of the scrubber and a second group of filter elements is provided with the filter elements thereof spaced alternately between pairs of adjacent elements of the first group. The elements of the second group are supported on a framework which is movable toward and away from the elements of the first group to increase and decrease the spacing between elements to maintain a relatively constant gas velocity. Should the volume flow rate of gases being treated in the scrubber increase, the buoyant pressure force of the gases acting on the filter elements of the second group increases and these elements are moved away from the elements of the first group thereby increasing the effective flow area or spacing between elements to maintain a relatively constant gas velocity. Should the volume flow rate of gas decrease, the buoyant force decreases correspondingly and the second group of filter elements are biased in the opposite direction to decrease the spacing of effective flow area between adjacent elements so that the velocity is maintained at substantially the same value. The particle separation efficiency being dependent on gas velocity is maintained relatively constant, even though the volume flow rate of gases introduced into the scrubber varies widely from time to time.

For a better understanding of the present invention, reference should be had to the following detailed description taken in conjunction with the drawings, in which:

FIG. 1 is a vertical sectional view illustrating an updraft, wet-type gas scrubber employing a new and improved filter apparatus constructed in accordance with the present invention.

FIG. 2 is a transverse, horizontal cross section taken substantially along line 2–2 of FIG. 1;

FIG. 3 is an enlarged, vertical, sectional view taken substantially along line 3-3 of FIG. 2 and showing the filter elements in an operating position with minimal spacing between elements; and FIG. 4 is a sectional view similar to FIG. 3 showing the filter elements in another operative position with maximum spacing between elements.

Referring now, more specifically, to the drawings, therein is illustrated one embodiment of a new and improved updraft, wet-type gas scrubber 10 which is adapted to use scrubbing liquid, such as water, for agglomerating and removing contaminants and other impurities from gas. The gas scrubber 10 includes an upstanding housing structure comprising a plurality of vertically stacked, sections 12, 14 and 16, respectively, and is supported from the floor or other surface on a plurality of legs or posts 18 extending downwardly from the lower housing section 12.

The lower housing section 12 includes vertical, upper sidewalls 20 and lower, inwardly and downwardly sloping walls 22 which form a liquid sump 24 at the lower end of the housing. The sloped walls 22 converge toward an outlet or drain opening defined at the upper end of a flanged drain fitting 26 and the scrubbing liquid and contaminants collected therein are removed from the liquid sump 24 through a drain or sewer line 28 running to a sewer or sludge removal system.

Contaminated gas to be treated in the scrubber 10 is directed into the lower section 12 of the housing through an inlet fitting 30 extending through an opening in one of the sidewalls 20, and the outer end of the fitting is connected to a supply duct 32 or other source of contaminated gas. As shown by the arrows A in FIG. 1, the contaminated gases directed into the scrubber through the inlet fitting 30 move upwardly into the next adjacent intermediate housing section 14 and the intermediate housing section includes a nozzle portion 34 between the upper and lower ends having a transverse cross-sectional area which is substantially less than the transverse area at the upper or lower end of the housing section. The upwardly moving contaminated gases flow at increased velocity as they pass through the reduced area nozzle section 34 and below the nozzle 34, the housing 14 is provided with upwardly and inwardly sloping sidewalls 36. The nozzle section 34 includes vertical outer sidewalls 38 and upwardly and outwardly sloping sidewalls 40 extend upwardly thereof to the upper end of the housing section 14.

As best shown in FIGS. 2, 3 and 4, the reduced flow area nozzle section 34 is provided with a peripheral inner framework 42 formed of channel members having upper and lower horizontal flanges extending outwardly toward and joined at their outer edges to the inside surfaces of the vertical walls 38. The framework 42 includes four channels joined at right angles to one another to form a square or rectangular shaped, high velocity throat or flow passage 44. The walls of the flow passage 44 are defined by vertical webs 44a FIGS. 2 and 3) of the channels, and the transverse cross-sectional area bounded by the webs 44a is substantially less than the transverse or horizontal cross-sectional area of the housing section 14 at either end, so that the velocity of the gas in the nozzle section 44 is substantially greater than the average flow velocity in other portions of the scrubber housing.

In accordance with the present invention, the reduced area flow nozzle section 34 is provided with a plurality of horizontal spaced-apart parallel, elongated filter elements 48—1 and 48—2. The filter elements 48 may comprise rods or hollow tubes or sleeves preferably formed of stainless steel or other corrosion resistant material. When stainless tubes are used they are mounted on axles 50 and are freely rotative therewith about the longitudinal axes of the elements as the gases flow upwardly through the slots or spaces between adjacent elements. The filter elements 48—1 comprise a first group supported in fixed relation in the reduced area nozzle structure 34 and opposite ends of the axles 50 project outwardly into and are supported in spaced openings 44b drilled in the webs 44a of a pair of facing channel members. The filter elements 48—2 comprise a second group and are spaced alternately between pairs of elements 48—1 in the first group. Each individual filter element 48—1 in the first group is free to rotate about its longitudinal axis but is restrained against vertical and horizontal movement relative to the channel framework 42 of the nozzle section 34 as the gases pass upwardly between the elements at high velocity.

The filter elements 48—2 in the second group are spaced alternately between the elements 48—1 and are mounted on a rectangular frame 52 formed of vertical plates 52a and one pair of oppositely facing plates is provided with outwardly extending horizontal support flanges 52b. The plates 52a are parallel with the inside webs 44a on the channels of the framework 42 and the flanges 52b are parallel to and spaced above the upper flanges of the channels.

As best shown in FIGS. 3 and 4, the lower edges of one pair of parallel plates 52a perpendicular to the elements 48 are provided with spaced apart, teethlike downward projections 53 for supporting opposite ends of the axles 50 which carry the filter elements 48—2 of the second group. The spacing between the projections or teeth 53 is sufficiently wide to permit both groups of filter elements 48—1 and 48—2 to lie in the same horizontal plane with the elements 48—1 projecting outwardly beyond the teeth without touching or interference. The filter elements 48—2 in the second group are movable in a vertical direction from a lower position shown in FIG. 3, wherein a minimum spacing s is provided between adjacent pairs of elements 48—1 and 48—2 to an upper position wherein a maximum spacing A is provided between the closest surface areas on adjacent pairs of elements 48—1 and 48—2. When a low volume flow rate of gas is introduced into the scrubber 10, the upward buoyant force of the gas passing through the nozzle section 34 is relatively low and the filter elements 48—2 remain in the lower position, as shown in FIG. 3, with the minimal spacing s obtaining and, accordingly, a relatively small, effective flow area is provided between the elements, resulting in a relatively high velocity of gas flow between each pair of adjacent elements 48—1 and 48—2. When the volume flow rate of gas introduced into the scrubber is increased substantially the greater buoyant upward force of the flowing gases tends to move the filter elements 48—2 in the second group upwardly from the position in FIG. 3 toward the position of FIG. 4, and this increases the spacing between elements as represented by letter A Accordingly, the effective flow area between each pair of elements is increased and the gas velocity between each pair of elements is maintained at substantially the same value as before even though the flow rate or volume has been greatly increased. The buoyant force of the upwardly flowing, high velocity gas lifts the elements 48—2 in the second group upwardly in an amount roughly proportional to the volume of gas supplied to the scrubber and the framework 52 which supports the elements in the second group maintains all of the elements in a common plane as they move up and down. The amount of displacement of the elements is responsive to the volume input of the gas and the displacement varies correspondingly to automatically maintain a relatively constant high velocity of gas flow between the adjacent pairs of filter elements 48—1 and 48—2.

The angle framework 52 which supports the second group of filter elements 48—2 is biased toward the downward or minimum spacing position of FIG. 3 by means of a plurality of compression springs 54 which are mounted beneath the upper flange of the channels of the framework 42 and outwardly of the web portions 44a thereof. The springs are effective to maintain and return the minimal spacing s between elements whenever the volume flow of gas into the scrubber is low and thereby maintain a minimum gas velocity between elements so as to obtain good separation efficiency. Each spring is held in centered position by a vertical center pin or bolt 56 in coaxial alinement with the coils of the spring, and the bolts extend upwardly through opening in the upper flange on the channels of the frame 42 and through alined openings or holes in the flanges 52b of the movable framework 52 which supports the second group of filter elements 48—2. Bearing washers 58 are provided at the lower or head end of the bolts 56 to engage the lower ends of the springs 54 and the upper ends of the springs bear against the underside of the upper flanges of the channels of the framework 42. Resilient cushioning washers 60 are provided to cushion the shock between the flange portions 52b of the upper frame 52 and the upper flanges of the channels of the lower framework 42 as the framework 52 moves up and down in response to increases and decreases in velocity of the gas. The washers 60 also set up the value of minimum spacing s between the elements in cooperation with the tightening or loosening of the compression on the springs 54. Pairs of adjusting nuts 62 are provided for selecting the desired amount of compression on the springs 54 to provide for a desired minimum velocity value of the flowing gas which will instigate upward movement of the second group of elements. The spacing between adjacent pairs of filter elements 48—1 and 48—2 in the flow nozzle structure 34 is automatically self-regulated or adjusted to adapt to the instantaneous flow rate of the gases being handled by the scrubber 10 and the flow velocity is maintained at a relatively constant value to insure a high collection efficiency.

After moving through the reduced area flow nozzle structure 34, the gases expand and slow down and then pass into an upper filter bed 66 mounted at the lower end of the upper housing section 16. The filter bed 66 includes a plurality of spherical filter elements 68 arranged several layers deep and the elements are supported on a screen or mesh 70. The gases flowing through the filter bed 66 pass through many diverse and tortuous paths around the surfaces of the individual filter elements and, accordingly, the gas accelerates and decelerates and changes direction rapidly.

In order to collect and agglomerate the dust particles and other contaminants and fumes in the gas and remove this material from the gas, a scrubbing liquid (usually water) is introduced into the gas from a plurality of spray nozzles 72 positioned below the filter elements 48—1 and 48—2 to direct a spray of finely divided liquid upwardly onto the surfaces of the filter elements. The scrubbing liquid is supplied to the spray nozzles 72 through a piping manifold 74, and the spray nozzles are preferably of the atomizing type which direct a finely divided spray of mist onto the surfaces of the filter elements 48—1, 48—2. Because of the high velocity of gas flow around and adjacent the surfaces of the filter elements, the finely divided liquid droplets are entrained into the gas flow and the dust particles and other contaminants in the gas are wetted with liquid and collect and agglomerate in the liquid droplets.

The wetted gases move upwardly through the flow nozzle structure 34 and into the filter bed 66 wherein further agglomerations and collections of the contaminant particles into the liquid droplets take place. Because the upwardly flowing gases passing into the filter bed 66 are wetted, the surfaces of the spherical filter elements 68 are wetted with a thin liquid film and the dust particles and contaminants impinge on the liquid film and are collected and agglomerated in the liquid. Individual liquid droplets begin to grow in size and become heavily laden with contaminants and this liquid is drained off through a line 75 to the sump 24.

An intense foaming action takes place in the upper levels or layers of spherical filter element in the filter bed 66 wherein a maximum interchange of dust and contaminant particles from the gases into the scrubbing liquid or bubbles takes place. The upper level of foaming action above the filter bed 66 is maintained by means of the drain line 75 and a scupper-type center drain 76 having a discharge pipe 78 and a sock-type rubber valve member 80 which opens periodically to discharge accumulated liquid in a relatively large quantity downwardly toward the sump 24.

After the gases have passed upwardly through the filter bed 66 and the foaming layer adjacent the upper portion of the bed, almost all of the contaminants have been removed; however, the gas still contains some liquid droplets and mist which should be removed from the gas before discharge from the scrubber. For this purpose, a rotary demist vane assembly 81 is mounted in the upper section of the housing 16 above the filter bed and the vane assembly includes an annular ring of demisting vanes 82 which impart a high velocity spiral flow direction to the gases, as indicated by the arrow B. The vanes 82 are sloped to direct the gases horizontally outwardly toward the inside surface of a perforated, inner cylinder 84 having a large number of perforations therein. Because the liquid droplets are heavier than the gas, they are centrifuged outwardly by the vanes 82 with greater force and readily pass through the perforations in the cylinder 84, eventually collecting and impinging on the inside walls of the housing section 16. These liquid droplets then flow downwardly and collect in an annular trough 86 formed around the inside of the housing section outwardly of the outer ends of the vanes 82. Collected liquid is drained periodically from the trough 86 through a drainpipe 88 having a sock-type valve 90 therein, and this liquid is directed into the filter bed 66. The annular ring of sloped demisting vanes 82 centrifugally separates the liquid droplets and liquid mist from the gases and the liquid is collected and reused in the filter bed 66. The swirling gases, after having the liquid mist removed, pass upwardly in the perforated cylinder 84 and eventually are discharged from the scrubber through an opening 16a at the upper end of the housing section via an outlet or discharge fitting 92. The fitting 92 is connected to an elbow 94 and downtake duct 96, or other suitable ductwork. A fan (not shown) is connected on the inlet or outlet side of the scrubber to supply the motive power for moving the gases through the scrubber. The perforated cylinder 84 serves to hide the separated out liquid from the upwardly swirling gas stream and prevents recombination of the liquid and gas.

The gas scrubber 10 of the present invention provides a new and unique automatically self-regulating filter apparatus for using a high velocity of gas flow through the apparatus even though the volume or flow rate of gas introduced into the scrubber varies widely. Automatic spacing adjustment between elements in the filter apparatus provides for a uniform, high efficiency removal of contaminants from the gas even though the volume flow rate of gas introduced into the scrubber varies greatly from time to time.

I claim:

1. In a gas scrubber having a flow passage for contaminated gas, a self-adjusting filter apparatus comprising a plurality of elongated filter elements extending transversely across said flow passage and defining a plurality of separate flow paths between each pair of adjacent elements, first support means for maintaining a first group of alternate ones of said elements in fixed relation in said flow passage and second support means for supporting at least one element in a second group comprising the remainder of said elements for movement toward and away from said elements of said first group to increase and decrease the spacing between at least one adjacent pair of elements in response to the flow pressure on said elements by said gas moving through said passage.

2. The apparatus of claim 1 wherein said filter elements are mounted on said first and second support means for free rotation about their longitudinal axes.

3. The apparatus of claim 1 including resilient means for biasing said second group of elements toward said first group of elements to decrease the spacing between adjacent elements and oppose the forces exerted on said second group of elements by the flow pressure of said gas acting on said elements as it moves through said flow passage.

4. The apparatus of claim 3 wherein said resilient means comprises at least one spring means interconnected between said first and second support means.

5. The apparatus of claim 3 wherein one of said support means comprises an annular frame means defining a wall portion of said flow passage and including opposite side members supporting opposite ends of said first group of elements.

6. The apparatus of claim 5 wherein the other of said support means comprises annular frame means having opposite side members supporting opposite ends of said second group of elements, said resilient means comprising a plurality of spring members interconnecting said frame means.

7. The apparatus of claim 1 wherein said elements are parallel and said second group of elements are movable from a position of minimum spacing between all elements lying on a common plane with said first group of elements to a maximum-spacing position wherein said second group of elements are displaced from said first group in the direction of gas flow.

8. The apparatus of claim 1 including means for limiting the movement of said second group of elements relative to said first group.

9. A gas scrubber comprising a housing defining a flow passage, a filter apparatus in said housing including a plurality of parallel elongated, spaced-apart filter elements extending across said flow passage, first support means for supporting opposite ends of a first group of alternate ones of said elements in a fixed position relative to said flow passage housing, and second support means for supporting at least one element in a second group comprising the remaining elements for movement relative to said elements in said first group to vary the spacing between elements of said first and second group in response to flow pressure of gas acting on said second group of elements during passage through said filter apparatus.

10. The gas scrubber of claim 9 wherein said second support means comprises annular frame means having opposite side members for supporting opposite ends of the elements of said second group and resilient means biasing said frame means in a direction toward the elements in said first group to reduce the spacing between adjacent pairs of elements in said groups.

11. The gas scrubber of claim 10 wherein said elements are supported for free rotation about their longitudinal axes and are disposed in a common plane to provide minimum spacing between adjacent elements and wherein said second group of elements is movable in a direction with the gas flow through said scrubber out of said common plane for increasing said spacing in response to gas flow pressure acting thereon as it moves through said filter apparatus.

12. The gas scrubber of claim 10 including means for adjusting the value of biasing force exerted by said resilient means.

13. The gas scrubber of claim 10 wherein said resilient means comprises a plurality of springs connected between said first and second support means.